April 7, 1959   D. G. FALCONER   2,880,959
VALVE APPARATUS
Filed Jan. 24, 1956   5 Sheets-Sheet 1

INVENTOR
David G. Falconer
BY Mason, Fenwick & Lawrence
ATTORNEYS

April 7, 1959     D. G. FALCONER     2,880,959
VALVE APPARATUS
Filed Jan. 24, 1956     5 Sheets-Sheet 3
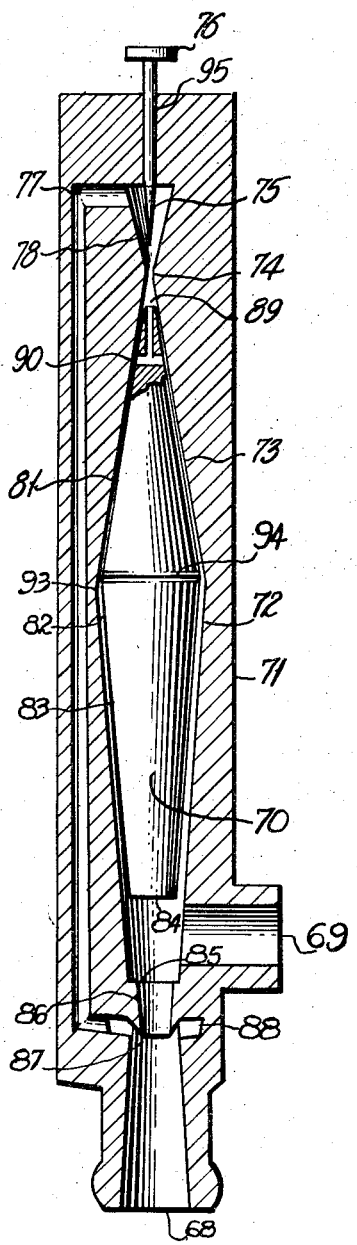
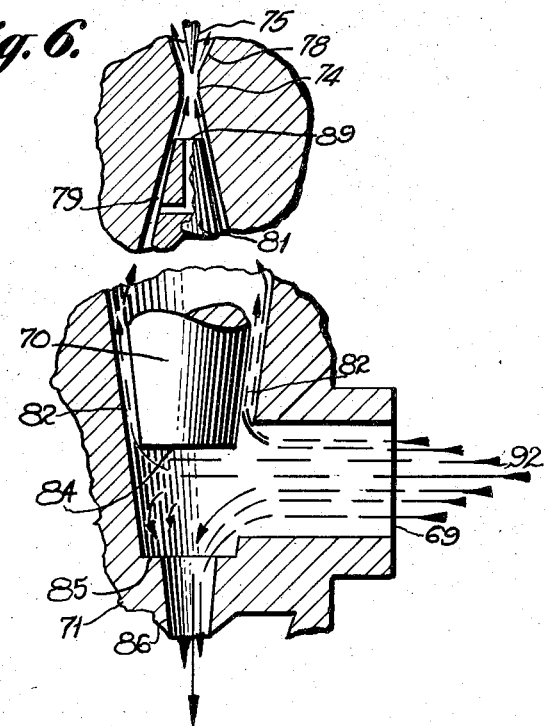
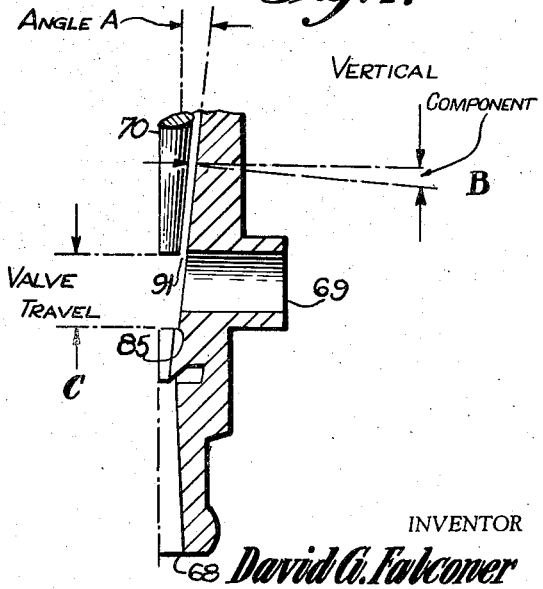
INVENTOR
David G. Falconer
BY
Mason, Fenwick & Lawrence
ATTORNEYS April 7, 1959 D. G. FALCONER 2,880,959
VALVE APPARATUS
Filed Jan. 24, 1956 5 Sheets-Sheet 4

INVENTOR
David G. Falconer

BY Mason, Fenwick & Lawrence
ATTORNEYS

April 7, 1959

D. G. FALCONER 2,880,959

VALVE APPARATUS

Filed Jan. 24, 1956

INVENTOR
*David G. Falconer*

BY *Mason, Fenwick & Lawrence*
ATTORNEYS

United States Patent Office 2,880,959
Patented Apr. 7, 1959

2,880,959
VALVE APPARATUS
David G. Falconer, Washington, D.C.
Application January 24, 1956, Serial No. 561,102
4 Claims. (Cl. 251—35)

This invention relates to valves in general and in particular to fluid valves which utilize the inherent qualities or properties of the fluid which they control to open, to close or to position.

The valves described herein contribute considerably to the fluid and pressure control art for reasons which should be quite evident to those having knowledge of the art.

It is a primary object of this invention to provide a valve means which will effect the passage of a large weight of fluid material per unit of time as a result of the operation of an actuating means connected with the said valve means, the force or energy magnitude required to operate the actuating means being minute when compared to the direct valve area times fluid pressure force which would have to be expended to open a valve of the same cross-sectional area directly.

It is a further object of this invention to provide a valve means as in the preceding paragraphs, the actuating means of which will position the valve infinitely between a full open station and a full closed station.

It is a further object of this invention to provide a valve means, the actuation of which as described in the preceding two paragraphs is suitable for universally attaching to a pressure or flow sensing apparatus.

Other objects and advantages of the invention will be apparent from the description and drawings, in which several species of the invention will be shown, the deviations from one another serving a useful purpose inasmuch as different applications of the valve may require different responses to flow, pressure, or viscosity characteristics. While this invention functions by reason of the most elementary fluid mechanics the structure which will be shown contains many characteristics which combine these simple physical principles to gain an advantage which is novel to the art. An attempt is made in the drawings to suggest considerations of the form and relation of the various parts of the invention but of course there are too many obvious variables involved in the flow in the invention, which are shown only for the purposes of illustration, to attempt a quantitative analysis here; however, the fluid mechanics upon which the invention is based dictated the form of the invention which is depicted in the drawings.

From the drawings which show a structural detail, typically, only when that structural detail is an entity of fluid function or of invention function, the invention may be practically applied.

With reference to the drawing:

Figs. 3, 4, 5, 6 and 7 are diagrammatic sections similar to the section of Fig. 1.

Figure 1:
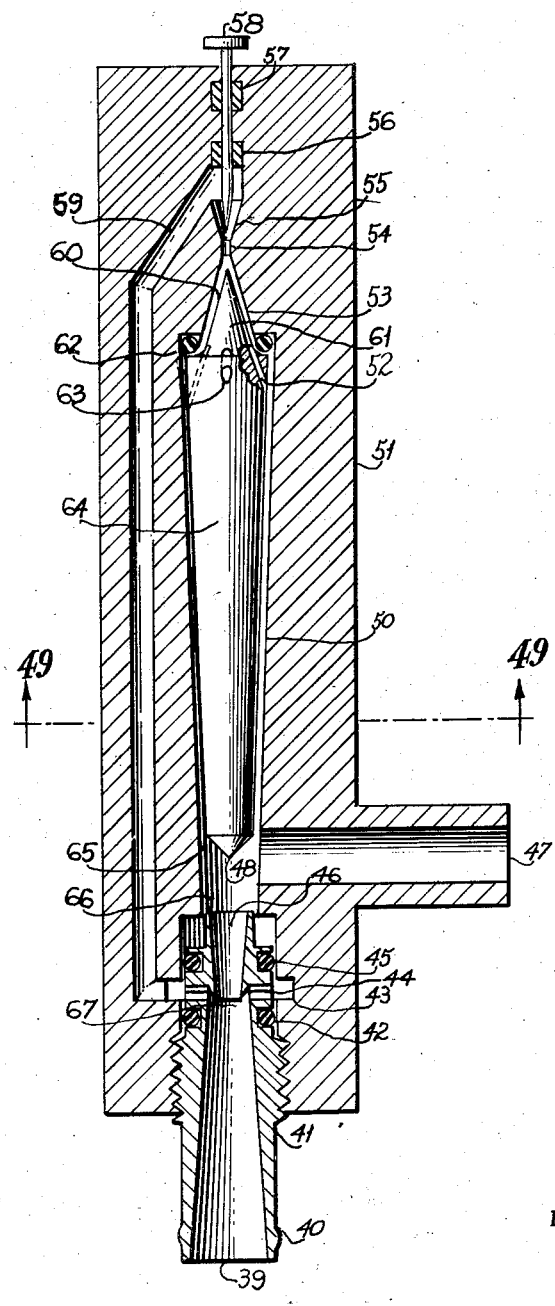
Fig. 1 shows a conventional sectional view and the principal parts of one species.
Figure 2:
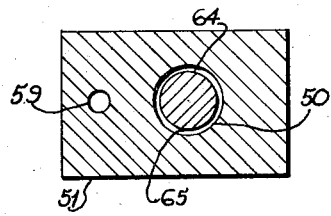
Fig. 2 is a section taken at 49—49 of Fig. 1.

Referring to Figure 1: The invention is shown here in an efficient form omitting superficial details for the sake of clarity. Its various functional parts are identified by Figure 1 and Figure 2 but the forces acting to control the valve are discussed in the description of Figures 3, 4, 5, 6 and 7. In Figure 1, a diverging nozzle 39 having an outer form of nipple suitable for attachment to a fluid system or line as at 40, a threaded portion 41, a grooved annule into which a sealing ring 42 is fitted, a similar sealing arrangement at 45, a converging nozzle 46, the major diameter of said converging nozzle serving as a valve seat 66, one or more openings or ports at 44 and entering into the interior of the nozzle at the area of the most efficient suction of the converging nozzle 67. The valve body or housing 51 is threaded to permit nozzle 39 to be adjusted to advance or to retract along a longitudinal axis concentric with the tapered piston 64. In this manner the tapered piston 64 can be made to bottom on valve seat 66 at such a position axially that the escape passage 65 can be controlled in cross sectional area. At 43 is illustrated an annule or fluid collecting ring in the body of the valve in such a position that communication is made with ports 44 and passage 59. The nipple 47 carries the fluid supply into the small end of the tapered bore 50. At the major diameter of bore 50 is located a resilient bumper or stop 62. Bore 50 now converges conically to form a nozzle 53; a throat is formed at 54. The throat 54 now diverges at 55. At 56 is shown a Teflon bearing and seal and this structure is repeated at 57. A slidable needle type pilot valve 58 to which may be attached a fluid sensing or controlling element moves axially in bearing seal 56 and 57 at the demand or need of the sensing element and thereby opens or closes orifice or throat 54. The tapered piston structure 64 becomes a valve cover at its small diameter 48; at its major diameter are located a plurality of holes 63 serving to allow fluid from escape passage 65 access to converging escape passage 60 between converging taper 61 of piston 64 and converging taper 53 of housing 51; a broken-away section 52 shows how holes 63 may by-pass bumper 62. However, a by-pass which would serve the same purpose could be placed in the main body of the housing 51 instead of in piston 64.

Figure 3:
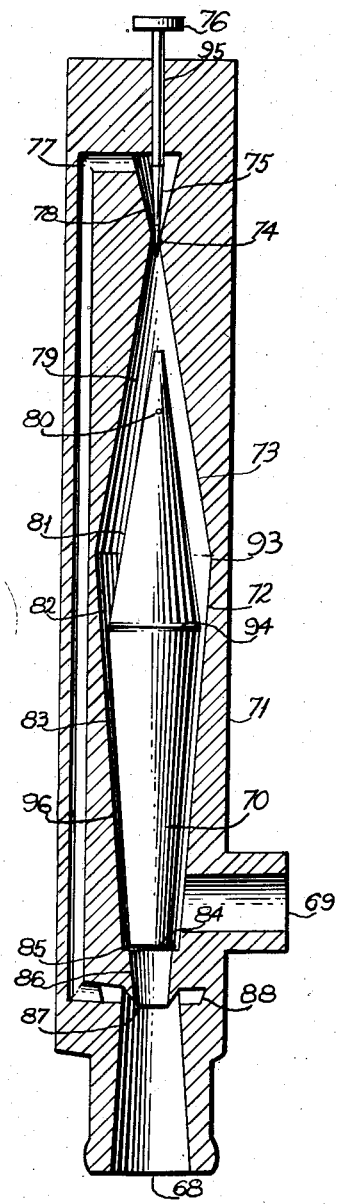
Figure 4:
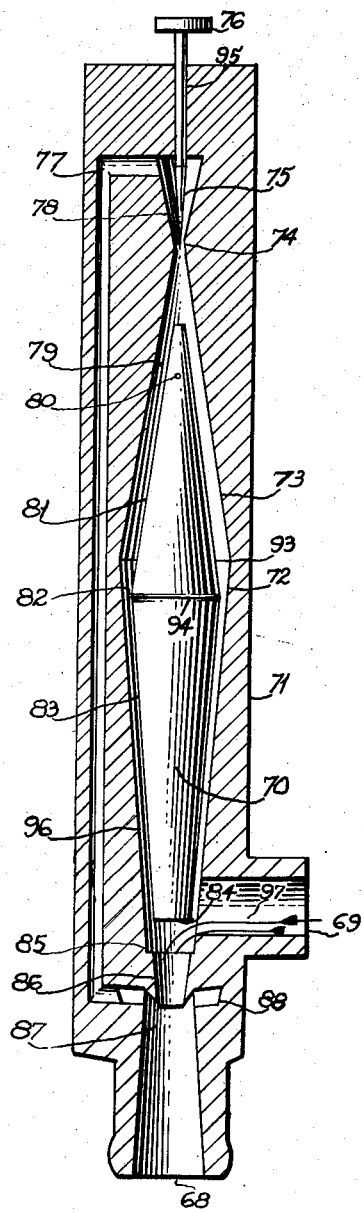

Reference should now be made to Figs. 3, 4, 5, 6 and 7 which in order of sequence schematically explain the operation of the invention. Like numerals of all of the schematic drawings and figures identify like functions, localities, or parts of each. For example numeral 75 of Figure 3 illustrates the characteristic shape of needle valve in Figures 4, 5 and 6. In Figures 3, 4 and 5 a connection to the source of fluid supply made at nipple or opening 69 leading through an aperture in valve housing 71 and communicating with a conical bore 72, the minor diameter of which is at 85 and the major diameter of which is at 93, at which diameter the bore joins concentrically and congruently the major diameter of a conical bore 73 which is truncated at the small throat 74. In this just described bore is slidably located a piston member 70 having essentially the same configuration as the bore, i.e. a minor diameter 84 serving as a valve closure for converging nozzle 86, a major diameter at 94 also concentrically and congruently joining a major diameter of cone 81. The throat 74 is short and diverges again into a conical bore at 78. A needle valve closure to the throat 74 is shown at 75, this valve having a shaft 95 which slidably moves in an axial manner in suitable bearings and seals, not shown here, and ends in a knobbed portion or another convenient form outside of housing 71. Bore 78 communicates with passage 77 and thereby to an annular groove 88 which is so located at the maximum suction area of diverging nozzle 68 that upon flow of fluid taking place through converging nozzle 86 a suction is effected at 87. In explaining the function of this embodiment of the invention the following assumptions will be made, nipple 69 having been joined or connected to a fluid pressure supply source.

No. I: The area of the throat orifice 74 is greater than the cross-sectional area of bore 72 cut at a plane at 96 minus the cross-sectional area of the piston 70 when this piston is seated as shown in Figure 3.

No. II: The area of throat orifice 74 is not much greater than the cross-sectional area of the diameter of bore 72 at a plane cut through bore 72 at 96 minus the corresponding cross-sectional area of piston 70 at the same plane 96 when piston 70 is at about the position shown in Figure 4.

No. III: The capacity of the nipple 69 is slightly greater than the capacity of converging nozzle 86. This is done in order that when piston 70 is in the position indicated at Figure 6 the escape passage 82 will be assured of a positive pressure build-up indicated by fluid flow lines 92.

No. IV: Both the surface of bore 73 and the taper of the conforming piston 81 are smooth and therefore permit the formation of a high-velocity streamline in the escape passage 79 therebetween. In general, in this area, roughly described as being between the major diameter at 93 and the throat at 74 every aerodynamic concept should be used to create a reduced pressure area. It has not been quantitatively illustrated here.

No. V: While it may seem, upon first consideration that the same reasoning of the last assumption might apply conversely, i.e., in a diametrically opposite manner to the area lying between bore 72 between the major diameter 93 and the minor diameter 85 this is not the case. That is; it may at first appear logical to create turbulence deliberately in escape passage 82 by the provision of serrations or grooves either on the piston surface 83 or the surface of the bore 72. This would destroy the versatility of application of the invention. It would limit its activity to certain flow condition, fluids, viscosities, etc. In the case of a compressible fluid it would merely result in the making of reservoirs lying between the entrance into pasage 82 at a plane cutting through passage 82 at 96 and a similar plane cutting through this passage 82 at 94. These reservoirs created thereby would serve to replenish the fluid being evacuated at throat 74; this is the opposite of the effect to be desired. Therefore, at the very best, the only result of creating turbulence by such grooves or voids in passage 82 would result in a design indeterminate or unpredictable. At the very worst, the diameter of throat 74 would have to be increased, thereby increasing the servo-operating force required to hold needle valve control 76 closed against the area times pressure force of throat 74.

No. VI: The major diameter of piston 70 at 94 is equal to twice the effective seating diameter of valve cover 84.

No. VII: Angle A of Fig. 7 is small. An angle of one half of a degree is satisfactory. In Fig. 7 in a resolution of forces it is, of course, obvious that if the valve has been open and that it is now desired to have the valve closed that a vertical component exists as shown by B tending to close piston 70 onto seat 85. If angle A were to be infinitely increased from its indicated slight degree until 90° were reached the action of opening or closing would encounter the Bernoulli components which would create relatively uncontrollable snap-action. It should be apparent that if we call the pressure acting in passages 79 and 82 the bias then the subject of the present invention is a valve having an infinitely variable bias. Another result of increasing angle A of Fig. 7 is, obviously, to diminish the valve travel as illustrated at C.

No. VIII: While the following assumption is integrated with the preceding one it should be stated again but for a different reason: The tapered piston should have a slight angle in order to restrict by means of a long and inefficient passage the proportional ability of the fluid in escape passage 82 from approaching volumetric efficiency of the combination of passage 79, throat 74 and nozzle 78.

With the preceding conditions No. I through VIII having been made, the action of the invention may be explained by referring to the hypothetical conditions illustrated in Figs. 3, 4, 5 and 6.

In Fig. 3 no demand has been signalled to pilot valve 76 therefore piston 70 is held closed by hydrostatic pressure of orifice area times pressure.

In Fig. 4 with the needle valve 75 partially open the piston 70 has opened a sufficient distance to satisfy the valve travel signalled to the pilot 75. In this figure it will be seen that a balance has been achieved: in place of the hydrostatic pressure holding valve 84 closed there now exists an appreciable vertical component tending to close the valve by the Bernoulli effect of the supply itself moving in somewhat the direction indicated by the fluid lines 97. But while piston 70 was moving away from the seat and thereby increasing the cross-sectional area of passage 82 the opposite taper of the piston was closing the gap or passage 79. It is appreciated that passage 82 is still small and therefore creative of an inefficient passage of fluid.

In Fig. 5 a demand has been signalled to open the valve to maximum capacity. It will now be noticeable that the passage 82 is wide open and that passage 79 has been reduced in cross-sectional area. It thus is seen that a vertical lift component has been acquired because of the contraction of the stream in passage 79 at high pressures and large valve travels.

Figure 6 is a broken-away section showing the essential of the balancing action at both the pilot valve area and the main valve area. In Figure 6 if the pilot valve 75 were moved down toward closing the throat 74 the flow as illustrated by lines 92 is now free to move into the substantially increased passage 82 through passage 79, through port 90 (as seen in Fig. 5) and out port 89. The volume between throat 74 and port 89 is relatively small and therefore any phase lag is inconsiderable.

It will be appreciated from the foregoing description that the structure of Figure 1 as described schematically in Figs. 3, 4, 5, 6 and 7 is a valve which in a highly efficient manner appropriates both the hydrostatic and simple hydraulic advantages in addition to the dynamic forces concerned with flow.

Figure 8:
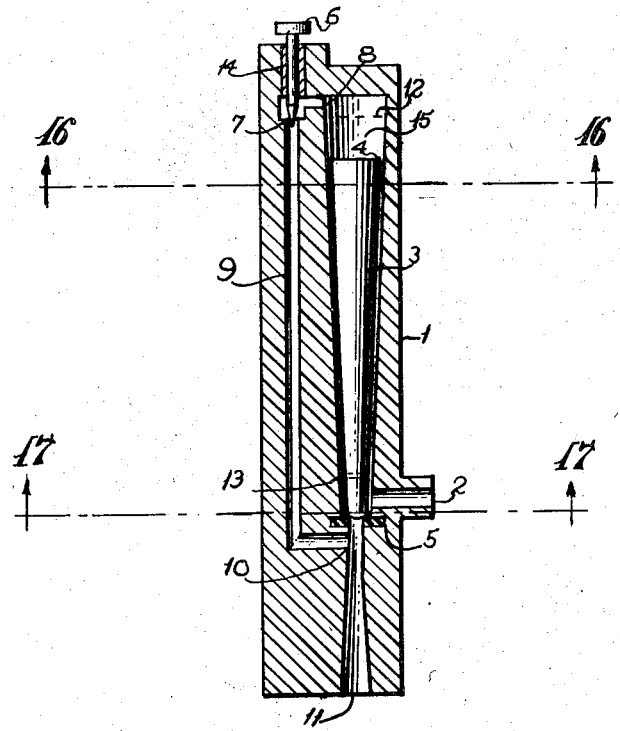
Fig. 8 shows a conventional sectional view and the principal parts of one species.
Figure 9:
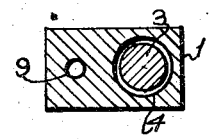
Fig. 9 is a section at 16—16 of Fig. 8.
Figure 10:
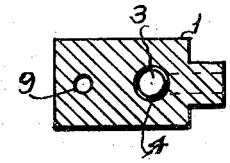
Fig. 10 is a section at 17—17 of Fig. 8.

With reference to Fig. 8: A valve body 1 comprises a supply opening 2 to a conical bore 15 in which is slidably located a conical shaped smooth surfaced piston 3 which serves as the valve. At the small end of tapered bore 15 is a valve seat 5 of a suitable material. At the large diameter of tapered bore 15 is located a passageway 8 to a pilot valve seat 7. A needle type valve 6 slidably moves through bearing and seal 14 as desired to effect closure of 7. Passageway 9 from valve seat 7 enters delivery nozzle 11 at a point so situated that an aspirator is formed at 10.

In Fig. 8 assume that pilot valve 6 is closed tight against seat 7; assume that piston 3 has the same taper in degrees as the taper of bore 15 and assume that the walls or tapered surfaces of both piston 3 and bore 15 are smooth and without serrations or grooves. Assume that when piston 3 is bottomed at 5 as shown, the area of valve seat 7 is greater than the area of the tapered bore diameter at position 13 minus the diameter of piston 3 at position 13; now assume that the valve is supplied with fluid pressure from source 2. The pilot valve 6 is openable by an axial pulling force at its knobbed end. A bearing and seal composed of Teflon, the inside surface of which presents a low co-efficient of friction has been found to make for a sensitive and satisfactory pilot valve operation. It will here be seen that pilot valve 6 is balanced, the diameter of its straight and guided shaft portion being slightly smaller than the effective diameter of its seat 7. Then, if valve 6 is opened allowing fluid to escape from the larger diameter of bore 15 and through the small escape passage 4 between piston 3 and tapered bore 15 it is evident that if the area of the large end of piston 3 minus the area of piston 3 at position 13 exceeds the effective area of the valve orifice 5, piston 3 will tend to rise off of seat 5 and admit fluid to the delivery nozzle 11. As piston 3 opens orifice 5 a reduction in the pressure in passage 9 consequently takes place because of the suction at aspirator 10. As the piston 3 is now lifted above the seat 5 and the escape passage 4 has been greatly increased in cross sectional area, thereby allowing the supply from opening 2 access to the upper part of bore 15 at 12. We should assume that supply 2 is larger in cross sectional area than the orifice diameter of valve seat 5. If valve 6 is now closed a supply of fluid exists at 12 and will force the main valve piston 3 closed, being aided by a Bernoulli component at the valve seat 5 as well as a similar component through escape passage 4.

If, however, the fluid pressure from supply opening 2 be increased beyond the flow capacity of the non-aerodynamic shape of the largest end of tapered bore 15 and subsequent passages shown, then the main valve 3 will not open; in other words the fluid will have reached the critical velocity at which the factor of resistance encountered is proportional to the square of the velocity. There are instances in fluid regulation in which the inability of the above described valve to open if the pressure of the supply exceeds this certain norm may be turned to advantage; i.e., if failure of an extremely high pressure reducer or regulator should fail, allowing an ungovernable surge to occur.

Figure 11:
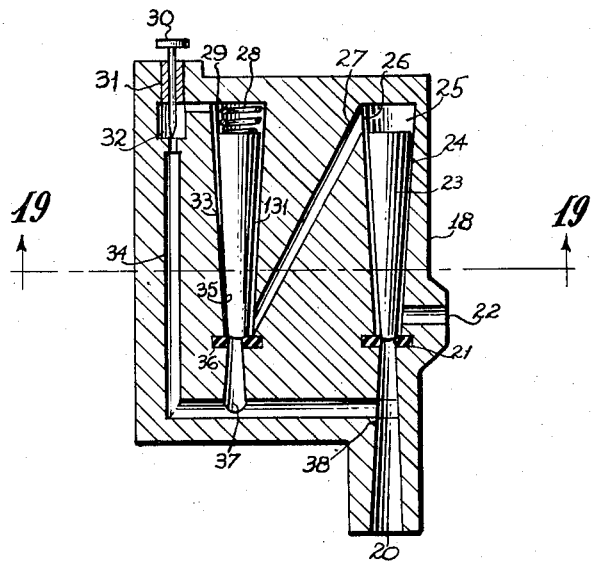
Fig. 11 shows an elaboration of the invention in Fig. 8.
Figure 12:
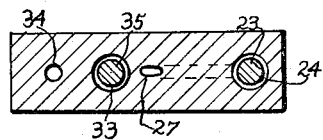
Fig. 12 is a section at 19—19 of Fig. 11.

Referring to Fig. 11: Structures and configurations analogous to Figure 8 will be recognized. The source of fluid supply enters valve housing 18 through passage 22 which communicates with the small end of tapered bore 25. Bore 25 being a smooth surface socket into which slidably rest a shape-conforming piston 23 the piston having the same degree taper as taper bore 25. At the small end of taper 25 is located a valve seat 21 composed of a material suitable for tight shut-off. The orifice of this valve seat 21 forms the channel for flow of fluid which terminates in a diverging nozzle 20. At the large end of bore 25 is an opening 26 leading into a passage 27 which communicates with the small end of a tapered bore 33, bore 33 being analogous in shape to bore 25 mentioned above. Into bore 33 slidably rests a tapered valve piston 35 which is analogous in configuration to piston 23 also mentioned above. The relationship between piston 23 and bore 25 are, of course, analogous to the relation between piston 35 and bore 33. A compression spring 28 may be placed in the large end of bore 33 in order to compel piston 35 to seat in a tight and leak-proof manner against seat 36, the orifice of seat 36 being analogous to, but smaller than seat 21. A passage 29 leads from the large end of bore 33 to pilot valve seat 32.

In Figure 11 assume that a slidable needle type valve 30, having an adquate bearing and sealing means 31, is held down against seat 32 to retain fluid pressure which will be assumed to have entered at opening 22 and to have filled all the passages and chambers identified in Figure 11, including in sequential order; the small cubage escape passage 24 between piston 23 and bore 25, through opening 26 and passage 27, said opening and said passage being larger in flow capacity than escape passage 24.

Continuing the fluid path is the second small cubage escape path 131 between piston 35 and bore 33, thence through passage 29 to pilot valve seat 32. It is obvious that if the pilot valve 30 is now opened that piston 35 will respond in similar fashion to piston 3 of Figure 8 and that the action of piston 35 will relay this response to control in a pilot fashion piston 23. It is also obvious that as many pistons as illustrated by piston 23 and piston 35 as desired may be employed in similar tandem manner to acquire a simple advantage in successive steps. In a manner similar to the action of the form of the invention in Figure 8, as the fluid leaves pilot valve orifice 32 it passes through channel 34, takes a course common to fluid path 37 which is the vessel carrying fluid admitted by valve 35. In a properly designed opening at the junction with nozzle 20 an efficient aspirator could be located at 38.

The foregoing embodiments of the invention are described only for the purpose of illustration and the scope of the invention is to be determined from the appended claims.

What is claimed is:

1. A valve apparatus comprising, a housing having a main bore and an inlet channel and an outlet communicating with said bore, a main valve plug mounted in said bore, a pilot valve governing the position of said main valve plug with respect to full open or full closed or any intermediate position, said main bore having at one end a valve seat and an orifice, said orifice communicating with said outlet, and near the same end of the main bore there being a communication with the inlet channel, the main bore having at the opposite end to the just described end a converging nozzle and throat, a diverging nozzle exterior of said main bore and in communication with said throat, said pilot valve having a tapered end seatable within said throat for selectively valving said throat by axial movement of said tapered end into and out of said throat, said pilot valve mounted coaxially of said diverging nozzle; the main bore being circular when cut by a hypothetical plane perpendicular to its longitudinal axis, said axis being concentric with the already mentioned structure, including: outlet, orifice, main valve seat, main valve plug, converging nozzle, throat, pilot valve and diverging nozzle; the shape of the main bore on said longitudinal axis increasing in diameter from the main valve end of the main bore to a larger diameter in a constant taper, said main bore then decreasing in diameter until the small diameter of the throat is reached at the opposite end of the main bore, the main valve plug closely conforming in shape with the main valve bore but being shorter and slightly smaller in diameter than said main bore and therefore slidable therein, the entire structure serving by static and fluid dynamic forces to open or to position the main valve plug upon the pilot valve at the throat being positioned to effect increased or decreased fluid pressure between the main valve plug large diameter and throat diameter.

2. Valve apparatus comprising, a housing having a valve chamber therein with rectilinear axis, being of circular diametrical cross-section and tapering toward one end, said valve chamber being provided with an outlet at said one end of said valve valve chamber coaxial with said chamber and an inlet adjacent said outlet, said outlet providing a major flow of fluid from said inlet through the adjacent end of said chamber, to be controlled by said apparatus, said housing being provided with a vent at the opposite end of said valve chamber to pass a minor flow of fluid from the said valve chamber, a valve plug freely occupying said valve chamber, the end of said valve plug adjacent said outlet functioning as a valve for said outlet, said valve plug conforming in shape to the tapered portion of said chamber and having less axial length than said valve chamber so that it is slidable axially therein, said valve plug when seated providing with said chamber an inefficient passage for the flow of fluid from said inlet to the maximum diameter of said valve plug, and a pilot valve controlling the escape of the fluid through said vent, so that the static and fluid dynamic forces acting on said valve plug will be changed responsive to said movement of said pilot valve to move said valve plug to full-open, full-closed or any position therebetween.

3. Valve apparatus as claimed in claim 2, wherein said housing is formed with a conduit affording communication between said vent and said outlet and said pilot valve controls the flow through said conduit.

4. Valve apparatus as claimed in claim 2, wherein means are provided for maintaining permanent fluid communication between said inlet and said pilot valve.

References Cited in the file of this patent

UNITED STATES PATENTS

| | | |
|---|---|---|
| 570,727 | Gale | Nov. 3, 1896 |
| 1,046,236 | Wagner | Dec. 3, 1912 |
| 2,633,868 | Berhoudar | Apr. 7, 1953 |